US008053922B2

(12) United States Patent
Müller

(10) Patent No.: US 8,053,922 B2
(45) Date of Patent: Nov. 8, 2011

(54) CLOSING SYSTEM FOR MOTOR VEHICLES

(75) Inventor: Ulrich Müller, Velbert (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 479 days.

(21) Appl. No.: 10/451,182

(22) PCT Filed: Nov. 28, 2001

(86) PCT No.: PCT/EP01/13883
§ 371 (c)(1),
(2), (4) Date: Jun. 20, 2003

(87) PCT Pub. No.: WO02/051676
PCT Pub. Date: Jul. 4, 2002

(65) Prior Publication Data
US 2004/0066092 A1    Apr. 8, 2004

(30) Foreign Application Priority Data

Dec. 22, 2000    (DE) ................... 100 64 546

(51) Int. Cl.
*B60L 3/00*      (2006.01)
*H04M 1/00*    (2006.01)
(52) U.S. Cl. ................... 307/10.1; 455/556.1
(58) Field of Classification Search ............... 307/10.1; 455/556.1
See application file for complete search history.

(56) References Cited

U.S. PATENT DOCUMENTS

| | | | |
|---|---|---|---|
| 5,719,551 A * | 2/1998 | Flick ................. | 340/426.25 |
| 6,092,133 A | 7/2000 | Erola et al. | |
| 6,148,212 A * | 11/2000 | Park et al. ............... | 455/456.1 |
| 6,690,268 B2 * | 2/2004 | Schofield et al. ............. | 340/438 |
| 2001/0005170 A1 * | 6/2001 | Heide et al. ................. | 340/5.61 |
| 2002/0196127 A1 * | 12/2002 | Benson ..................... | 340/10.4 |

FOREIGN PATENT DOCUMENTS

| | | |
|---|---|---|
| DE | 196 43 020 C1 | 3/1998 |
| DE | 198 23 122 A1 | 12/1999 |
| DE | 198 46 452 A1 | 12/1999 |
| DE | 19823122 A1 * | 12/1999 |
| DE | 198 38 129 A1 | 2/2000 |
| DE | 199 39 064 A1 | 2/2001 |
| EP | 0864822 | 9/1998 |
| EP | 0914994 | 5/1999 |

OTHER PUBLICATIONS

ZDNet News-Hardware-CAA, Sep. 27, 2000, Mueller.

* cited by examiner

*Primary Examiner* — Rexford Barnie
*Assistant Examiner* — Dru Parries
(74) *Attorney, Agent, or Firm* — Lucas & Mercanti, LLP; Klaus P. Stoffel

(57) ABSTRACT

The invention relates to a closing system for motor vehicles involving access authorization and driving authorization by means of a control unit provided with means of communication. Said communication means comprise a stationary transmitter-receiver unit in the vehicle and a mobile transmitter-receiver unit in a wireless hand telephone (10). The control unit monitors the data transferred during said communication for access or driving authorization and activates or deactivates the corresponding systems if authorization is valid. The hand telephone (10) contains an SIM card (15) for telephonic network operation. In order to use the closing system in a quick and comfortable manner, the SIM card (15) is also a carrier for the access and driving authorization data. (16). A bi-directional local communication hands-free system operating in the GHz range is also used in the motor vehicle. Said telephonic local communication is also used for transmitting access and/or driving authorization data (16).

3 Claims, 2 Drawing Sheets

CLOSING SYSTEM FOR MOTOR VEHICLES

The invention concerns a locking system of the type specified in the introductory clause of Claim 1. The access authorization and driving authorization are determined by communication devices, whose stationary parts are located in the vehicle and whose mobile parts are integrated in a wireless hand telephone, which hereinafter will be referred to simply as a "mobile phone". This type of communication is called "keyless-entry" communication.

In the known locking system of this type (DE 198 38 129 A1), the housing of the mobile phone contains a transponder, which contains the data for the access authorization. This transponder acts as a type of electronic key for the locking system. An exchange of data takes place with the base station in the vehicle. After successfully concluded access control protocol, the access authorization system responds and enables operation of the vehicle doors and hatches.

In a method for keyless operation of a vehicle door-locking device (DE 199 39 064 A1), it was proposed that a mobile radio data transmission channel be used to transmit a first remote-control signal from a large distance. Only when a mobile phone with an integrated transponder approaches, is a second signal connection to the vehicle established, which carries out the unlocking operation.

In a multifunctional telephone system for vehicles (DE 198 23 122 A1), information is transmitted to a mobile phone by a transmitter-receiver unit located in the vehicle as a function of output signals of control units, which are located in the vehicle. Alternatively, this information is transmitted to the transmitter-receiver unit in the vehicle by the mobile phone to initiate operations of control units in the vehicle.

A starter-ignition lock for vehicles is operated by a mobile phone (DE 196 43 020 C1). To increase security, a telephone unit, which communicates with the mobile phone, was integrated in the circuit for identification of the input signal. An enabling signal is made possible only when a properly registered mobile phone is connected with this unit. There is also a method that works in this way for vehicle starter-ignition security (EP 0 914 994 A1).

In a limited-access system (DE 198 46 452 A1), depending on identification information of a user, it is possible to evaluate whether the user is or is not authorized to use the limited-access system. This information is derived from a mobile telephone owned by the authorized user. This information can be stored on the memory card, the so-called SIM card, of the mobile telephone. This makes it possible to establish the identity of the user and reliably evaluate the access authorization. In practice, it has not been possible to implement this system. The telephonic operation, on the one hand, and the key function, on the other hand, are difficult to coordinate, especially since separate data memories, data readers, and electronic components in the housing of the mobile telephone have been necessary for this in the past.

It has recently become possible to use bidirectional local communication that operates in the GHz range between different components of an electronic system instead of connecting cables. This use includes, for example, the action of a cordless computer mouse on the control unit of a computer. A local communication system of this type is known, for example, as a so-called "blue-tooth system".

The object of the invention is to develop a simple locking system of the type specified in the introductory clause of Claim 1, which is easier to implement in practice. This object is achieved by the measures cited in Claim 1, which have the following special significance.

In the invention, the purchaser of a vehicle receives from the car dealer, instead of or in addition to the set of keys for the vehicle, a SIM card, which not only allows telephone operation for a mobile phone, but also contains the access and/or driving authorization for this vehicle. The owner of the vehicle merely needs to insert this SIM card into his mobile phone. This allows him telephonic use and, in addition, automatically allows access to the vehicle or operation of the vehicle. Specifically, the mobile phone operates in the GHz range with bidirectional local communication in a hands-free system in the vehicle, when the owner of the mobile phone desires telephonic service in the vehicle. Specifically, in the invention, communication devices are provided in the vehicle, which recognize whether the mobile phone is located inside or outside the vehicle. This local communication intended for telephone traffic simultaneously provides for the transmission of the access and driving authorization data stored on the SIM card. In this regard, the associated control for this local communication is designed in such a way that it works not only inside the vehicle, but also a certain short distance outside the vehicle. The local communication outside the vehicle is sufficient for the transmission of the access authorization data.

Additional measures and advantages of the invention are apparent from the secondary claims, the following description, and the drawings. The drawings show schematic representations of an embodiment of the invention.

Figure 1:
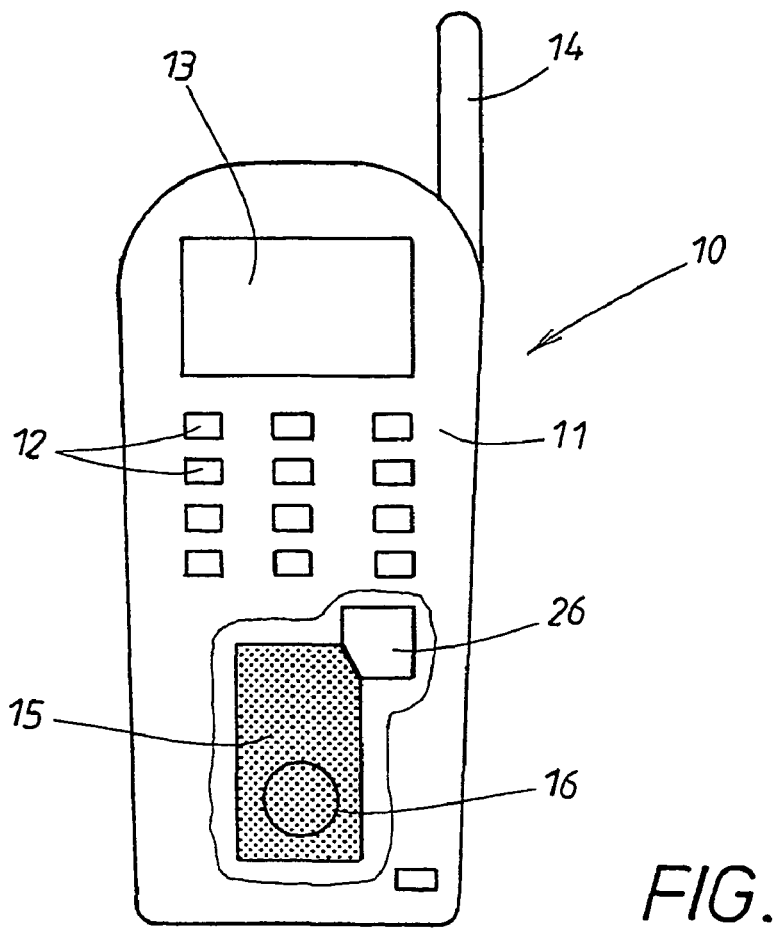
FIG. 1 is a schematic top view of a mobile phone for the locking system of the invention.

FIG. 1 shows schematically the basic design of a hand telephone 10, which, as was mentioned earlier, shall be referred to simply as a "mobile phone". The housing 11 of the mobile phone 10 contains a keypad 12 and a display window 13, which are used for telephonic operation. Telephonic operation occurs via an operating network by means of an antenna 14 provided on the housing 11. Use of the operating network requires the acquisition of a certain so-called SIM card 15. The SIM card 15 is inserted in a specific insertion compartment in the housing 11, which is not shown in detail. Only then does it become possible to use the mobile phone as a telephone in the associated operating network. This also requires the standard energy sources in the mobile phone 10, e.g., batteries and telephone electronics, which are not shown in detail.

Figure 3:
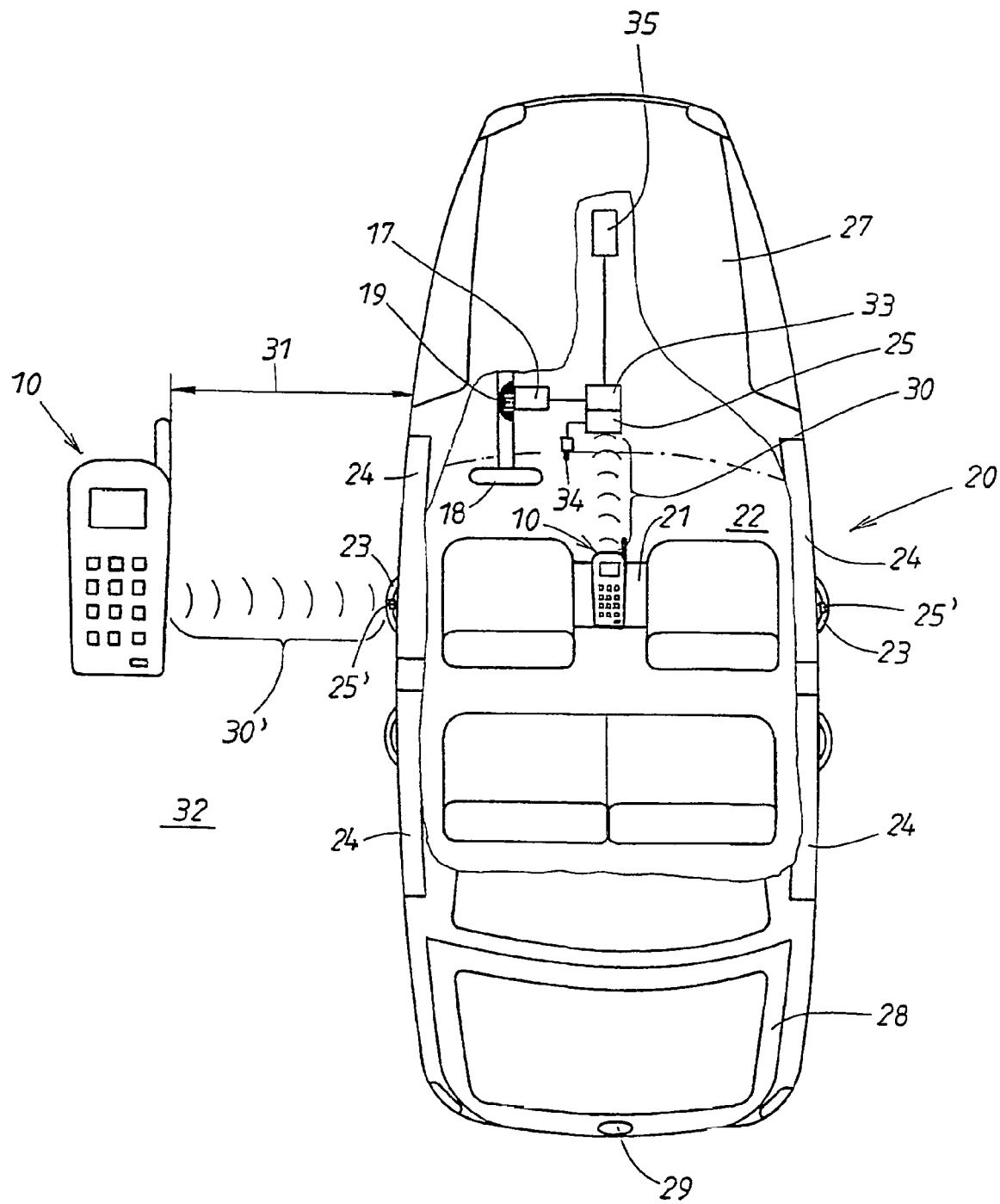
FIG. 3 shows schematically the operation of the locking system of the invention in an automobile.

FIG. 3 shows a motor vehicle 20, which has a cradle 21 for the mobile phone 10 in the interior 22 of the vehicle. The vehicle 20 is provided with a hands-free system, which allows bidirectional local communication 30 operating in the GHz range (illustrated by the waves drawn in FIG. 3) with a stationary transmitter-receiver unit 25 located in the vehicle 10. As indicated in FIG. 1, the mobile phone 10 has a corresponding mobile transmitter-receiver unit 26 that operates in the GHz range, which can communicate with the stationary unit 25 up to a specific range. This communication could also occur via the antenna 14, which is intended for normal telephone operation. As indicated earlier, telephone operation is possible via this local communication 30.

Figure 2:
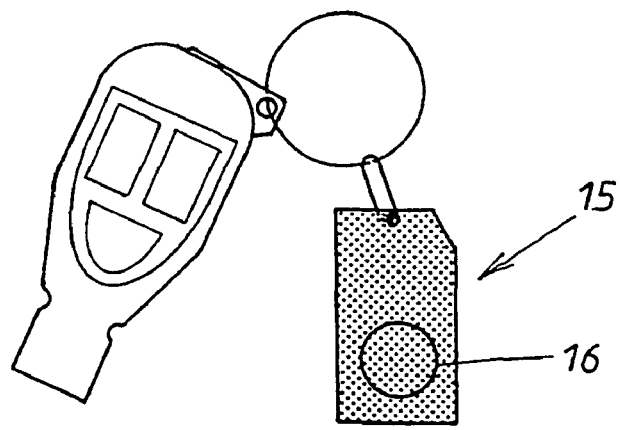
FIG. 2 shows the operating means given to the owner of the vehicle by the car dealer, which also allow the use of the mobile phone shown in FIG. 1.

In the invention, the SIM card 15 simultaneously serves as the carrier of data specific to the vehicle 20, which are located in the data field 16, which is symbolically indicated by a circle in FIGS. 1 and 2. These data include an access authorization to the vehicle, but, advantageously, they also include data for the driving authorization of the vehicle 20. This is explained in greater detail with reference to FIG. 3.

FIG. 3 shows several doors 24 on the vehicle 20, an engine compartment hood 27, and a hatch door 28. These means of access 24, 27, 28 are locked by standard locking devices, which are not shown in detail, so that manual operation of the outside door handles 23 and hatch door actuators 29 is not possible at first. These locks operate by the keyless-entry system, in which, of course, the mobile phone 10 is the data carrier. As has already been mentioned, the special feature here is that access authorization data of this type are included in the above-mentioned data field 16 of the SIM card 15 of the mobile phone. The data is again transmitted in the GHz range by local communication devices. This is accomplished not only by the mobile units 26 in the mobile phone 10, but, advantageously, also by external transmitter-receiver units 25' indicated in the external region 32 of the vehicle 20, which, for example, are integrated in the outside door handles 23 of the front doors. If the authorized individual approaches within a certain distance of the vehicle 20 with his mobile phone 10, these units 25' respond, and local communication 30', indicated by waves, occurs between the mobile phone 10 and the vehicle 20. These external units 25', like the above-mentioned units 25 located in the vehicle interior 22, are linked with a symbolically indicated control unit 33 in the vehicle 20. If the communication 30' leads to agreement between the data 16 in the mobile phone 10 and the vehicle-specific data prestored in the control unit 33, then the locks are released.

A data exchange of this type can already be effected as the vehicle 20 is approached. It is more favorable for this exchange not to occur until the owner of the mobile phone has brought his hand close to the outside door handle 23. The data exchange in the GHz range occurs so fast that the owner of the mobile phone does not even notice it as he operates the door handle 23. When he operates the handle 23 as usual, first the local communication 30' proceeds, the control unit 33 releases the locks, and the operation of the handle unlocks the door 24 and hatch 28. The owner can then open the door 24 by means of the door handle 23 and get into the vehicle interior 22.

As has already been mentioned, the SIM card 15 also contains driving authorization data in the data field 16. In the interior 22 of the vehicle, the owner may either leave the mobile phone on his person or conveniently place it in the cradle 21. In either case, the above-mentioned local communication 30 for operation of the telephone becomes active in the vehicle interior 22. In accordance with the invention, this local communication 30 is then also used for transmitting the driving authorization data from the SIM card 15 of the mobile phone 10. The above-mentioned internal transmitter-receiver unit 25 in the vehicle interior 22 is critical for this.

The control unit 33 acted upon by the transmitter-receiver unit 25 can enable and disable a large number of additional functions in the vehicle, including, for example, a locking unit 17 for the steering wheel 18 of the motor vehicle 20, which is acted upon by the control unit 33. This locking unit 17 either activates or inactivates a locking pin 19 for the steering column. Under normal circumstances, with the vehicle 20 at rest, the steering wheel 18 is locked by the locking pin 19. In the vehicle interior 22, e.g., on the dashboard, a manual operating switch 34 connected with the control unit 33 can be operated. If the authorized mobile phone owner moves the manual operating switch from its off position to its first operating position, then—if this has not already occurred—at this time at the latest, a data interrogation can be started via the local communication devices and, if successful, will activate the operation of the manual operating switch 34.

A first result of the actuation of the manual operating switch 34 is the reversal of the locking unit 17. The locking pin 19 is inactivated and releases the steering wheel 18. Another result is the switching on of the electrical system in the vehicle 20, e.g., the switching on of the electric power supply of the various electrical devices in the vehicle 20, e.g., a car radio.

After this successful data interrogation via the local communication devices 30, further operation of the manual operating switch 34 for controlling the other functions of the driving authorization is also successful. For example, in a second and third operating position of the manual operating switch 34, not only the engine electronics can be activated, but also, finally, the engine can be started. This occurs in the usual way. The operating means 35 necessary for this are also connected with the central control unit 33, as FIG. 3 symbolically illustrates.

By operation of the manual operating switch 34 in the opposite direction, the operating means 35 for the engine can be successively switched off. Only after the engine is shut off, does the central control unit 33 act on the locking unit 17 and activate the locking pin 19 on the steering wheel 18. This operation may also occur by data interrogation via the local communication 30 described above.

If the mobile phone owner leaves the vehicle interior 22 and steps to the outside 32 of the vehicle with his mobile phone 10, the door 24 and hatch 28 of the vehicle 20 can again be secured by the above-described actions in the external local communication region 30' and the external units 25'. This can be done automatically or by operating an appropriate key, e.g., on the mobile phone. Here again, the data interrogation is activated by information contained in the data field 16 of the SIM card 15. The vehicle 20, which is now turned off, is protected from access and driving by unauthorized persons who do not have this mobile phone 10 with the vehicle-specific SIM card 15.

LIST OF REFERENCE NUMBERS 10 hand telephone, mobile phone
11 housing
12 keypad of 10
13 display window of 10
14 antenna of 10
15 SIM card of 10
16 data field in 15, data for 20
17 locking unit for 18
18 steering wheel of 20
19 locking pin at 17
20 motor vehicle
21 cradle in 20 for 10
22 vehicle interior
23 outside door handle
24 door on 20
25 stationary internal transmitter-receiver unit in 20
25' stationary external transmitter-receiver unit of 20
26 mobile transmittet-receiver unit in 10
27 engine compartment hood of 20
28 hatch door of 20
29 actuator of 28
30 internal local communication between 10 and 25
30' external local communication between 10 and 25'
31 distance between 10 and 20 for 30'
32 vehicle exterior space 33 control unit, central control unit in 20
34 manual operating switch for engine of 20
35 operating means of engine in 20

The invention claimed is:

1. Apparatus for operating vehicles (20) with two different operating systems, namely with an access authorization system for releasing and locking of doors (24) or hatches (28, 27) in the vehicle (20), as a first operating system,
   with a driving authorization system for starting, operating, and stopping an engine in the vehicle (20) and enabling and disabling a steering wheel (18) of the vehicle (20), as a second operating system,
   and with a control unit (33) for both systems, which is operated by two different communication devices,
   wherein the communication devices consist of two different stationary transmitter-receiver units (25, 25') in the vehicle (20) but only one common mobile transmitter-receiver unit in a wireless hand telephone (mobile phone 10),
   and the control unit (33) checks the transmitted data and, corresponding to checked results, activates or deactivates the two associated systems,
   with a SIM-card, for the telephonic network operation of the mobile phone (10), which can be inserted in and, if necessary, removed from its housing,
   wherein the SIM card (15) simultaneously serves as the carrier both for the access authorization data of the communication (16) and vehicle-specific driving authorization data (16) for rendering operative the engine electronics, for starting and for operating the engine, are arranged on the SIM-card (15),
   and with a hands-free system in the vehicle (20) for a bi-directional local communication (bluetooth system 30) of the mobile phone (10) which operates in the GHz range,
   wherein the two different communications devices are formed, on the one hand, as an
   external communication device (25') at the vehicle, which automatically transmits the access authorization data without actuation of buttons on the mobile phone (10) when the mobile phone (10) is in a vehicle exterior position (32), and, on the other hand,
   as an internal communication device (25) arranged in the vehicle interior (22) which recognizes the vehicle interior position of the mobile phone (10) and which, without actuating any buttons on the mobile phone (10), automatically transmits the driving authorization data,
   and wherein the driving authorization data (16) of the SIM-card (15) are received and evaluated by the near communication (bluetooth-system 30) of the mobile phone (10) which operates in the GHz range with the internal communication devices.

2. The apparatus according to claim 1, wherein the transmitter-receiver device (25') acting in the exterior area (32) of the vehicle (20) is integrated in the door handle (23) and/or in the actuating device (29) of the rear flap (28).

3. The apparatus according to claim 1, wherein a cradle for the mobile phone (10) is located in the vehicle interior (22) and wherein the inner transmitter-receiver device (25) for the local communication (bluetooth-system 30) is arranged in the area of the cradle.

\* \* \* \* \*